US00RE40249E

(19) United States
(12) Reissued Patent
Cannata et al.

(10) Patent Number: US RE40,249 E
(45) Date of Reissued Patent: Apr. 22, 2008

(54) INFRARED IMAGING SYSTEM EMPLOYING ON-FOCAL PLANE NONUNIFORMITY CORRECTION

(75) Inventors: Robert F. Cannata, Santa Barbara, CA (US); Jeffrey L. Metschuleit, Louisville, KY (US)

(73) Assignee: Amber Engineering, Inc., Goleta, CA (US)

(21) Appl. No.: 09/667,826

(22) Filed: Sep. 21, 2000

Related U.S. Patent Documents

Reissue of:
(64) Patent No.: 5,811,808
Issued: Sep. 22, 1998
Appl. No.: 08/712,891
Filed: Sep. 12, 1996

(51) Int. Cl.
*G01J 5/20* (2006.01)
*G01J 5/24* (2006.01)

(52) U.S. Cl. ..... 250/332; 250/349; 250/370.08
(58) Field of Classification Search ..... 250/252.1, 250/332, 349, 370.08, 338.4
See application file for complete search history.

(56) References Cited

U.S. PATENT DOCUMENTS 4,719,512 A 1/1988 Endo et al.
4,752,694 A 6/1988 Hegel, Jr. et al.
4,771,267 A 9/1988 Russell, Jr. et al.
4,903,144 A 2/1990 Stefanik et al.
4,953,028 A 8/1990 Murayama et al.
4,987,294 A 1/1991 Romer
5,157,500 A 10/1992 Gusmano
5,159,457 A 10/1992 Kawabata
5,162,912 A 11/1992 Ueno et al.
5,182,446 A 1/1993 Tew
5,286,976 A 2/1994 Cole
5,300,915 A 4/1994 Higashi et al.
5,489,776 A 2/1996 Lung
5,528,035 A 6/1996 Masarik et al.

FOREIGN PATENT DOCUMENTS

JP 5-264357 10/1993

*Primary Examiner*—Constantine Hannaher
(74) *Attorney, Agent, or Firm*—Harrington & Smith, PC

(57) ABSTRACT

An infrared imaging system having a focal plane array including an array of detector elements and a readout circuit and including nonuniformity correction circuitry on the focal plane array. The individual detector elements correspond to pixels of an infrared scene to be imaged. Offsets in detection signals from each pixel arising from nonuniformities in the individual detector elements in the array are corrected by storing offset correction values for each detector element and using the stored offset values to control correction circuitry as the respective detector element signals are read out. The detector array and readout circuit are preferably formed as a monolithic or hybrid structure and the offset correction is provided on the focal plane array prior to signal amplification and analog to digital conversion.

54 Claims, 10 Drawing Sheets

RS

CS

SAMPLE

OFFSET

SELECT

S-RST $S_0$ $S_1$ $S_2$ $S_3$

RST

INFRARED IMAGING SYSTEM EMPLOYING ON-FOCAL PLANE NONUNIFORMITY CORRECTION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to infrared detection systems and imaging systems. More particularly, the present invention relates to infrared detection and imaging systems employing either noncooled or cryogenically cooled focal plane arrays.

2. Description of the Prior Art and Related Information

Infrared imaging systems have a variety of applications ranging from military applications to commercial applications such as home and business surveillance systems and manufacturing inspection systems. While military applications have been driven by a desire for high performance with less emphasis on cost, the rapidly developing commercial applications require good performance at reasonable cost along with good reliability. Therefore, maximizing these various aspects of an infrared imaging system is a key to creating a commercially viable product. Nonetheless, significant problems arise in achieving this goal since tradeoffs are required between performance, cost and reliability. Such considerations typically involve the two key components of an infrared imaging system: the infrared detector itself and the readout circuitry for converting the detector signals to image data which may be effectively processed into a high quality image.

One approach to infrared detector design employs a so-called focal plane array composed of a large number of detector elements arranged in a two dimensional array. An infrared focusing lens is employed to focus the incident infrared energy into an image on the array of detector elements. Thus, the detected infrared energy at each detector element in the focal plane array corresponds to a picture element (pixel) of the infrared scene to be imaged. The focal plane array will typically have a relatively large number of individual elements, or pixels, the number being related to the image quality.

To minimize manufacturing costs and to maximize uniformity of the detector elements in the focal plane array, it is highly desirable to form the array of detector elements on a single monolithic integrated circuit. Each element in turn must be biased to give a suitable detection signal and each detection signal must be separately read out. Since the integrated circuit chip in which the detector elements are formed is typically quite small, the readout wiring can become a problem due to space availability on the chip and pinout constraints. To accommodate these considerations, some type of intelligent readout circuitry is typically provided on the focal plane array itself. The form in which the readout circuitry is integrated with the focal plane array detector will depend upon the specific detector array structure.

For cryogenically cooled focal plane array detectors employing photoconductor or photovoltaic detection, the readout circuitry is typically formed in a separate integrated circuit which is "bump bonded" to the detector integrated circuit to form a single hybrid detector/readout structure. An alternate approach incorporates the detector and the readout circuitry in a monolithic integrated circuit. Such monolithic structures may be used, for example, for microbolometer infrared detector arrays. In microbolometer infrared detectors, the incident infrared energy is detected by measuring a change in resistance in the microbolometer caused by a temperature increase or decrease due to the incident infrared energy. In a monolithic microbolometer array, an array of separate microbolometers is formed on top of a readout integrated circuit which acts as a support substrate.

A consideration which is extremely important for maximizing the quality of the output image from a focal plane array infrared detector is compensating for nonuniformity in the individual detector elements in the array. Whereas ideally a uniform temperature scene directed to the focal plane array would produce a completely uniform output at each pixel, in practice, the output of the individual detector elements may vary by a significant percentage of the average output level. When an actual scene is detected, such detector element nonuniformity can significantly degrade the image quality or even completely mask the actual image. This degrading of the image due to detector element nonuniformity is sometimes called spatial or fixed pattern noise.

Although any focal plane array infrared detector will have variation in the average or DC response of the individual detector elements, and hence suffer from fixed pattern noise, this problem is particularly severe in the case of microbolometer focal plane arrays and specifically focal plane arrays employing microbridge-type microbolometer detector elements. Such nonuniformity problems are due in part to the fact that the above noted microbolometer detectors are adapted to operate at noncryogenic (i.e., noncooled) temperatures as opposed to the cryogenically cooled photoconductor and photovoltaic type detectors. Also, the fabrication technology employed in microbridge microbolometer detectors inherently introduces higher degrees of nonuniformity than is present in cryogenically cooled detection systems.

The problem of nonuniformity in the detector elements is directly related to issues of manufacturing throughput and cost. That is, if very high uniformity is required for the detector arrays to ensure good image quality, the number of focal plane arrays which must be rejected will increase on average. This in turn reduces throughput, increasing per unit costs. Therefore, it is generally preferable for nonuniformity to be tolerated by virtue of compensation in the detector electronics rather than controlling nonuniformity during detector array fabrication.

In prior art approaches to compensating for the nonuniformity in infrared focal plane arrays, and in particular in microbolometer infrared focal plane arrays, the nonuniformity has been corrected utilizing digital signal processing electronics configured on a separate integrated circuit, normally separate printed circuit board, from the focal plane array itself. Since the detected signals from each element of the array are typically quite small, they must be amplified by a relatively large gain before being routed off-chip, and of necessity before analog-to-digital conversion. As a result, the DC offsets due to detector nonuniformities are also amplified by a relatively large gain. This requires the analog-to-digital converter to have an extremely large dynamic range in order to accommodate the large signal range caused by the amplified detector element nonuniformities. Such high resolution analog-to-digital converters, however, add cost to the system electronics.

Also, the larger signal range requires the entire digital signal processing electronics to accommodate a larger overall bit value, further increasing the system cost. Also, since the image data for each pixel must be separately compensated for offsets due to nonuniformities at the scan rate of the array, very high bandwidth electronics are required to perform the digital offset correction. This, in turn, adds further cost to the system.

Alternatively, the signal dynamic range of the detector may be artificially limited of the amount of amplification provided to the detector signal prior to analog-to-digital conversion restricted. Both these alternatives have disadvantages, however, in that the image quality and/or signal-to-noise ratio are reduced.

Accordingly, it will be appreciated that a need presently exists for a way to reduce the effects of nonuniformities in infrared focal plane arrays and to thereby increase image quality in a focal plane array imaging system. It will further be appreciated that a need presently exists for such a solution which does not add significantly to the cost of the overall infrared imaging system and which is compatible with the processing constraints of hybrid or monolithic focal plane arrays.

SUMMARY OF THE INVENTION

The present invention provides a solution to the above noted problems by providing an infrared focal plane array detection system employing on-focal plane nonuniformity correction which compensates for the inherent nonuniformities in the detector elements forming the focal plane array. This allows nonuniformities in the detection signal outputs from the individual detector elements in the focal plane array to be compensated prior to the amplification necessary for further signal processing. This in turn provides improved image quality as well as reduced cost in the signal processing circuitry by avoiding the necessity for expensive high resolution analog-to-digital converters and associated digital offset correction processing. Additionally, greater nonuniformities in detector arrays may be tolerated increasing yields, and hence reducing cost, of an array manufacturing process.

More specifically, the present invention provides an infrared imaging system comprising an infrared focal plane array having a plurality of infrared detector elements arranged in an array, and a readout circuit electrically coupled to the plurality of detector elements. The readout circuit includes means for biasing the plurality of detector elements so as to provide separate detection signals corresponding to each detector element in the array of response to incident infrared radiation and means for separately correcting offsets in the detection signals provided from the plurality of elements in the detector array to compensate for nonuniformities in the detector elements. The corrected detection signals are provided as an output of the focal plane array. The imaging system further includes means for storing a plurality of offset correction values, corresponding to the plurality of detector elements, and means for providing the offset correction values to said means for correcting. The means for correcting may thus employ the offset correction values to separately correct for offsets for each detector element. The offset correction values may preferably be binary values and the means for storing may be a digital memory. A separate binary offset correction value may thus be stored for each detector element in the array.

In a further aspect of the present invention, the means for correcting may comprise a correction circuit including a plurality of parallel connected circuit elements, and means for selectively electrically connecting said circuit elements into the detector readout circuit in response to said stored offset correction values. The plurality of parallel connected circuit elements may comprise a plurality of capacitors or constant current sources. The means for selectively connecting may comprise a plurality of switches, equal in number to the plurality of parallel connected circuit elements and connected in series therewith.

In a further aspect of the present invention, where the plurality of detector elements are arranged in a plurality of rows and columns, the means for correcting may comprise a separate offset correction circuit for each column which circuit performs correction for all the detector elements in the column in a time multiplexed manner. The means for providing the offset correction values provides said offset correction values in a time multiplexed manner to the correction circuits. This may reduce the amount of readout circuitry required.

Further advantages of the present invention will be appreciated by consideration of a specific preferred embodiment of the present invention described below.

DETAILED DESCRIPTION OF THE INVENTION

Figure 1:
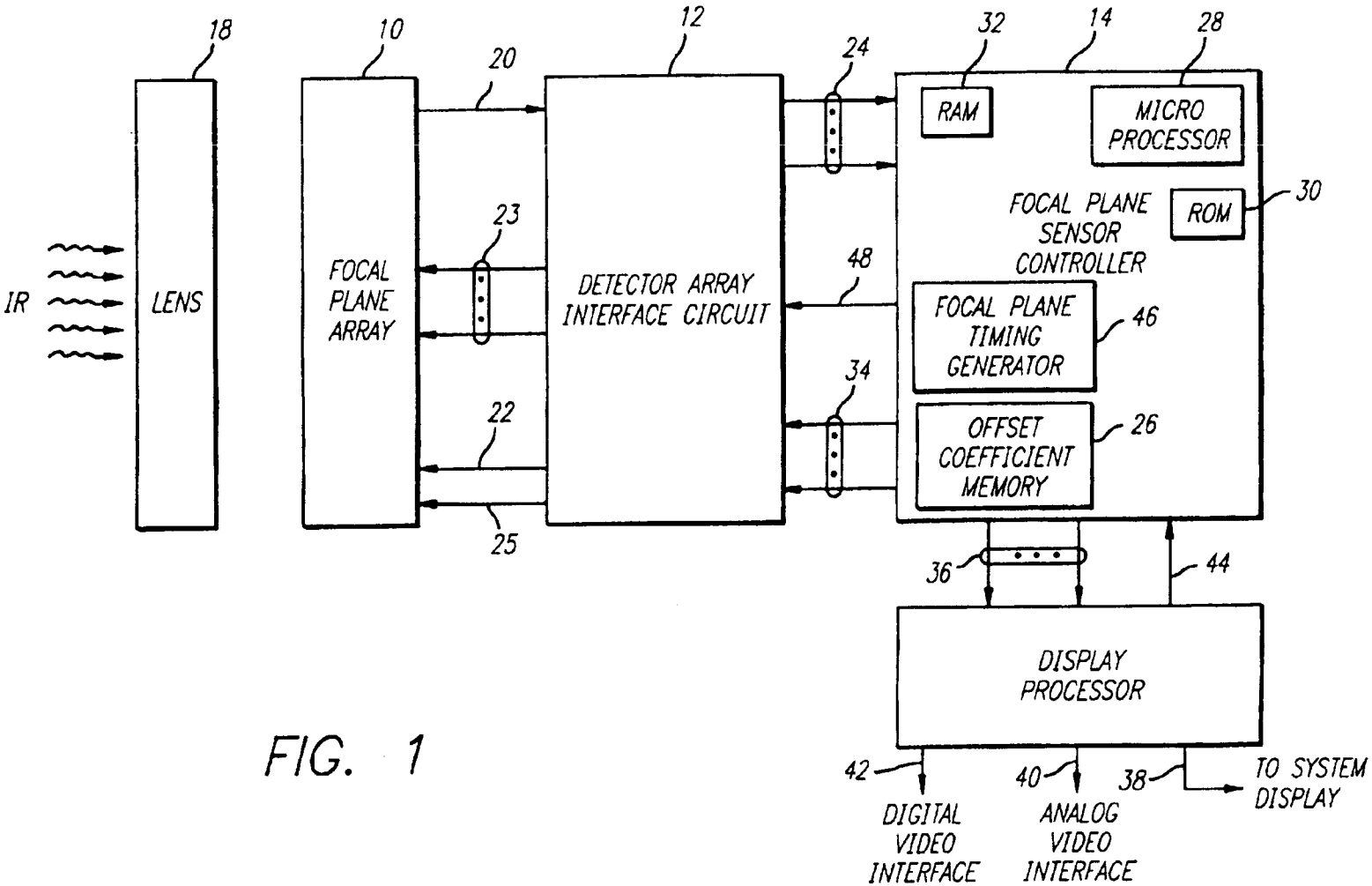
FIG. 1 is a block schematic drawing of an infrared focal plane array imaging system in accordance with the present invention.

Referring to FIG. 1, a block schematic drawing of an infrared focal plane array imaging system in accordance with the present invention is illustrated.

As shown, the principal components of the infrared imaging system include focal plane array 10, detector array interface circuit 12, focal plane sensor controller 14, and display processor 16. Incident infrared (IR) radiation is focused onto the focal plane array 10 via IR lens 18. It will be appreciated that the relative size of lens 18 and focal plane array 10 are not shown to scale in FIG. 1 as lens 18 will be adapted for the specific application and may vary in size over a wide range and will typically be substantially larger than the focal plane array 10.

The focal plane array 10 preferably employs an array of detector elements formed in a two dimensional array, corresponding to the pixels of the image data. The array of detector elements is structurally integrated with a readout circuit, described in more detail below, to form a combined detector/readout structure.

Focal plane array 10 may preferably employ an array of microbolometer detector elements formed directly on a readout circuit IC acting as a substrate, to form the combined detector/readout structure. In particular, a micromachined microbolometer infrared detector array of the type described in U.S. Pat. No. 5,300,915 to Robert E. Higashi, et al., the disclosure of which is incorporated herein by reference, may be formed directly on top of a readout integrated circuit substrate. In the detector array of the '915 patent, each microbolometer detector element includes a microbridge structure made from silicon nitride and a detector material deposited thereon which has a resistivity which varies generally inversely with the temperature of the material. In particular, vanadium oxide may be employed for such microbridge detector material. The temperature of this detector material, in turn, is altered by incident infrared radiation being absorbed by the silicon nitride microbridge. Such a microbridge structure has advantages in that the detector material is thermally isolated from the substrate and thus is less sensitive to temperature variations in the substrate unrelated to incident infrared radiation. The processing of such microbridge structures can place constraints on the readout circuitry, however, as it generally requires that the readout circuitry be fabricated employing a planar topography for each readout unit cell. The focal plane array 10 will preferably be configured on a support, such as a ceramic substrate configured inside a vacuum chamber. Also, a thermoelectric cooler is preferably provided (not shown) to stabilize the temperature of the readout substrate.

Alternatively, focal plane array 10 may employ a hybrid detector/readout structure employing photovoltaic or photoconductor detector elements. The hybrid structure may be achieved via indium bump bonding of separate detector and readout ICs as described in U.S. Pat. No. 5,264,699 to Jeffrey Barton, et al., the disclosure of which is incorporated herein by reference. An alternate approach to formation of such a hybrid structure is described in U.S. Pat. No. 5,308,980 to Jeffrey Barton, the disclosure of which is also incorporated herein by reference. Other hybrid structures may also be employed and include configurations with a detector integrated circuit and a readout integrated circuit independently bump bonded to a "fanout" substrate to form a structurally integrated hybrid structure. Also, a so-called vertically integrated photodiode hybrid structure may be employed which employs metal feedthrough contacts which connect a detector structure formed on a readout integrated circuit substrate to the circuitry in the readout integrated circuit. Such photovoltaic and photoconductor focal plane arrays typically must be operated at cryogenic temperatures and a cryogenic cooling system (not shown) must therefore be provided.

The output of focal plane array 10, which provides the detection signals corresponding to each pixel of the array, is provided on one or more output lines 20. The output signals are preferably time multiplexed to reduce the number of pins required. The electrical inputs to focal plane array 10 in turn are the biasing signals needed to bias the detector elements and drive the readout circuit and timing signals to control the readout of signals from the array. As discussed in more detail below, such timing signals may preferably include a master clock signal, a FRAME SYNC signal provided once per frame and a LINE SYNC signal. These timing signals and electrical biasing inputs are illustrated by lines 22 and 25, respectively, in FIG. 1. Focal plane array 10 also receives digital offset correction signals provided along line 23 which allow individual correction of offsets due to nonuniformities in each detector element of the array, as will be discussed in more detail below.

Detector array interface circuit 12 receives the analog detection signals provided from focal plane array along line 20 corresponding to each pixel of the array. Detector array interface circuit 12 performs any analog filtering or other analog conditioning which may be desired on the analog detection signals provided along line 20 and then performs an analog to digital conversion to form a desired number of bits of image data for each pixel of the array. For example, 12 bits of image data for each pixel is presently preferred for a moderately priced infrared camera for commercial applications. It will be appreciated, however, that additional image quality may be achieved by increasing the number of bits of resolution at a corresponding cost. Since the detection signals provided along line 20 are preferably in the form of time multiplexed signals for each pixel, for example provided on a row-by-row basis, the detector array interface circuit will analog-to-digital convert such signals on a corresponding time multiplexed basis and read the pixel image data into a buffer memory. For example, a commercially available RAM of suitable size (i.e., having storage capacity equal to the number of pixels in the array times number of bits per pixel) may be employed.

After storage in the buffer memory, additional digital conditioning may be performed on the raw image data, if desired for the particular application and the associated cost and performance required. The digital processed image data is then provided along in parallel form along lines 24 to focal plane sensor controller 14. For example, the image data may be provided in N bit parallel fashion, where N is the number of sample bits for each pixel. Alternatively, the image data may be provided in a serial fashion to focal plane sensor controller 14.

As noted above, detector array interface circuit 12 also provides the appropriate analog biasing voltages (and/or currents) along lines 25 to focal plane array 10. Accordingly, detector array interface circuit 12 includes the appropriate bias signal generating circuitry. The analog-to-digital conversion circuitry, buffer memory, and biasing circuitry employed in detector array interface circuit 12 may be conventional in nature and accordingly are not described in more detail herein. Since the detector array interface circuit 12 will include a number of discrete components in a presently preferred embodiment, it is preferably formed as a printed circuit board. It will be appreciated, however, that alternate embodiments may also be employed such as discrete components mounted in another manner or a suitable VLSI circuit incorporating both analog and digital capabilities, for example, in a so-called BiCMOS architecture.

Still referring to FIG. 1, the focal plane sensor controller 14, as its name suggests, provides intelligent control of the focal plane array 10. In particular, during initial calibration of the focal plane array and optional subsequent calibrations, the uniformity in the individual detector elements in the focal plane array 10 is detected and digital offset correction coefficients stored in offset coefficient memory 26. The use of such offset coefficients will be discussed in more detail below.

Microprocessor 28 is preferably provided to monitor operation of the focal plane array as well as to perform optional periodic uniformity offset calibrations as well as other optional calibrations, under control of the user. Also, microprocessor 28 may implement various diagnostic and test routines for periodic testing of the focal plane array 10 and/or for determining the nature of any problems which may occur during operation of the infrared detection system. The control programs for microprocessor 28 are stored in a nonvolatile memory illustrated by ROM memory 30 shown in FIG. 1. The offset coefficient memory 26 in turn is preferably a writable nonvolatile memory such as an electrically erasable programmable read only memory (EEPROM) or battery supplied RAM.

The focal plane sensor controller 14 also includes a random access memory (RAM) 32 for receiving the digital image data provided along lines 24 from the detector array interface circuit 12 and storing the data while microprocessor 28 performs any calibration or diagnostic calculations on such data in accordance with the diagnostic or calibration microprograms described above.

As further shown in FIG. 1, the focal plane sensor controller includes focal plane timing generator 46. Timing generator 46 generates the master clock signal as well as the focal plane readout timing signals, FRAME SYNC and LINE SYNC. These timing signals are provided along line 48 to interface circuit 12. The timing generator also provides these timing signals to control readout of the offset coefficient memory in synchronism with the readout of the focal plane array. The uniformity offset coefficients are thus provided in parallel form along lines 34 to detector array interface circuit 12, which provides the coefficients along line 23 to the focal plane array 10, in synchronism with the appropriate timing signals to control readout and simultaneous offset correction as described in more detail below.

It will be appreciated that focal plane sensor controller 14 will include a number of discrete components and therefore is preferably implemented in a printed circuit board. Alternative implementations are also possible, however, including discrete components mounted in another manner.

Still referring to FIG. 1, display processor 16 receives the digital image data provided along lines 36 in parallel form from the focal plane sensor controller 14. Display processor 16 may provide any number of known processing functions on the image data under user control including zoom, contrast, brightness, image enhancement (such as noise reduction processing), etc. The image data is then converted to a conventional raster scan analog signal and provided to a system display along line 38. If the system is a handheld infrared camera, such as commonly employed for surveillance applications, the system display may simply be a viewfinder. A second output for the video image signal is also provided, as illustrated by line 40, which may be provided to a video tape recorder, second display or other device and may preferably be a standardized video interface for analog video signals. An additional digital video interface may optionally be provided, as indicated by line 42, for providing digital image data for additional digital processing, storage or display.

The control signals provided along line 44 are responsive to input by the user of the IR imaging system. Display processor 16 may include user operable inputs, for example, push buttons or the like, for selecting various operational modes which in turn will cause appropriate control signals to be provided along line 44. Since these various functions of display processor 16 may be conventional in nature, no further description is provided of such functions herein. Display processor 16 will preferably be implemented as a number of discrete components mounted on a printed circuit board inside a housing having the associated controls and interface.

It will be appreciated by those skilled in the art that the partitioning of the above noted functions into the functional blocks 10, 12, 14 and 16 may be varied with the particular application and the space requirements and performance requirements of the overall system. For example, the offset coefficient memory 26 described above as being configured as part of the focal plane sensor controller 14 may also be configured in the detector array interface circuit 12 or on the focal plane array 10, space constraints permitting. Also, while the analog-to-digital converter circuitry has been described, as being located in the detector array interface circuit 12, such circuitry may also be located on focal plane array 10, space constraints permitting. Furthermore, various signal processing functions described as being located in the detector array interface circuit 12 may be provided directly on the focal plane array 10, space constraints permitting. Additionally, it will be appreciated that various other circuits and functions described above in relation to the various functional blocks 10, 12, 14 and 16 may be altered given the specific space, performance and cost constraints of the particular application of the infrared imaging system. Furthermore, while the focal plane array 10, detector array interface circuit 12, focal plane sensor controller 14 and display processor 16 have been described as being configured on separate printed circuit boards, it may be possible in certain applications to combine the circuitry onto fewer, or even one printed circuit board.

Also, it will be appreciated that certain circuitry may be combined to increase efficiency or to lower cost in certain applications. For example, while detector array interface circuit 12 has been described above as including a RAM memory having capacity to hold an entire frame of pixel data, it may be adequate to reduce the size of such memory and instead employ RAM 32 for buffering entire frames of the image data. Alternatively, a single RAM memory 32 may be employed with a portion thereof partitioned and allocated for use by the detector array interface circuit 12, especially if the circuitry 12 and 14 are configured on a single printed circuit board allowing a single RAM memory to be shared. Similarly, if the microprocessor 28 has associated therewith a nonvolatile memory, such as a battery operated RAM memory for storing information when the main power supply is not operating, such nonvolatile memory could also be used to store the offset coefficients indicated as being stored in separate memory 26. It will be appreciated that a variety of other modifications in the arrangement and functional breakdown of the circuitry may also be provided in accordance with a variety of design considerations such as space, cost, performance and the requirements of the specific application and the above described arrangement is merely illustrative in nature.

Referring to FIGS. 2 and 3A, 3B and 3C, the readout circuitry of the focal plane array 10 in accordance with the present invention is described in more detail.

Figure 2:
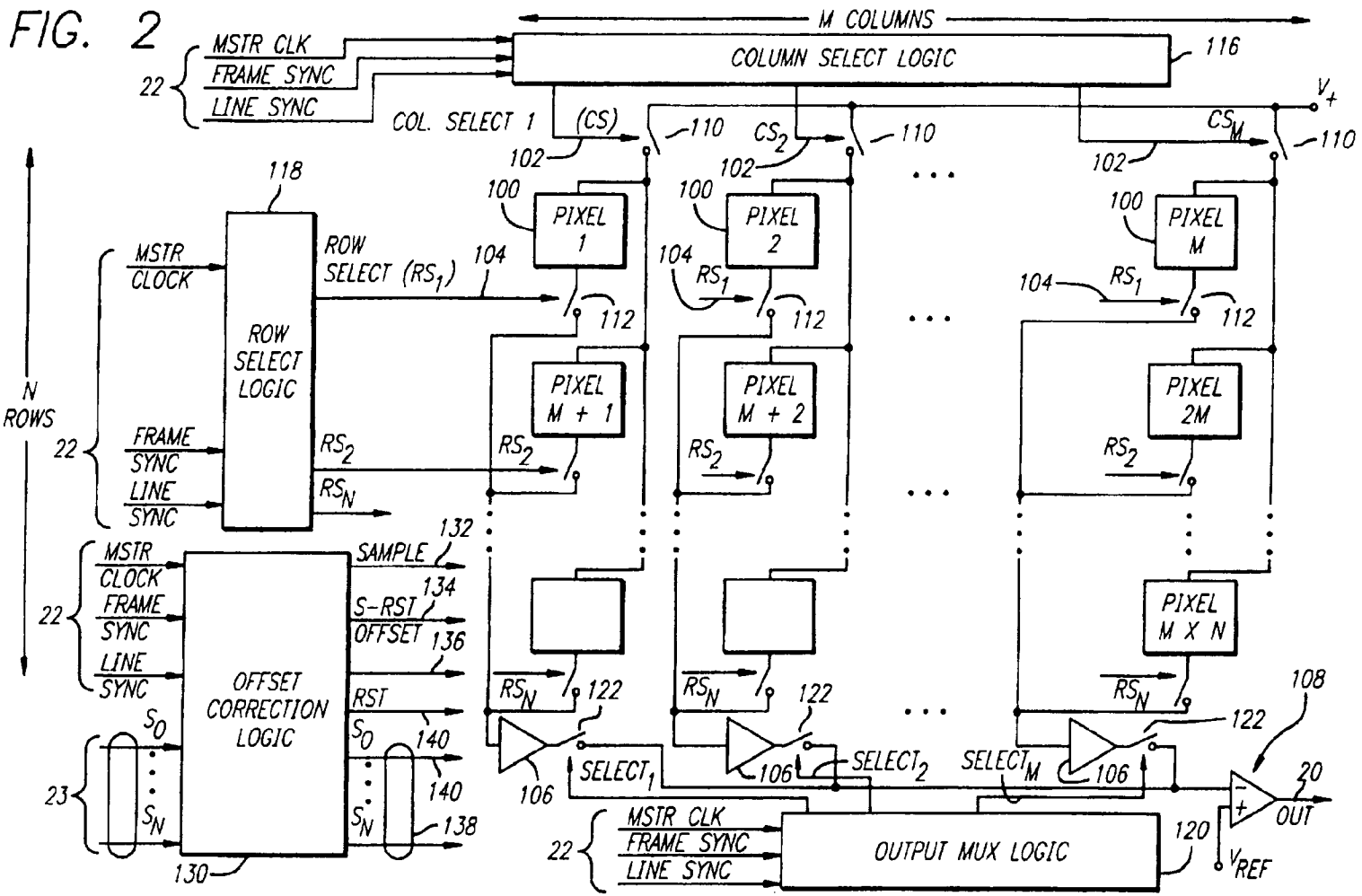
FIG. 2 is a block schematic drawing of the focal plane array shown in FIG. 1, in accordance with the present invention.

FIG. 2 illustrates a focal plane array 10 of pixels arranged into an array of M columns and N rows. The readout circuit includes a plurality of readout cells 100, M×N in number, corresponding to each pixel. The individual readout cells illustrated in FIG. 2 are read out by a plurality of column and row address lines 102, 104, respectively. Thus, as illustrated, a plurality of column address lines 102 provide respective column select (CS) signals $CS_1, CS_2 \ldots CS_M$, corresponding to each column of the M×N array, to corresponding switches 110. Similarly, a plurality of row address lines 104 provide respective row select (RS) signals $RS_1$, $RS_2$ . . . $RS_N$ corresponding to the N rows of the M×N focal plane array to row select switches 112. The column select and row select signals are strobed so as to read out the individual readout cells 100 in a desired manner, for example, in a raster scan row-by-row readout pattern or any other desired readout sequence. The output from each readout cell 100 is thus provided in a time multiplexed manner to serial output line 20 illustrated in FIG. 1 and described above.

The individual column select and row select signals are provided by column select logic 116 and row select logic 118, respectively. As shown, the column select logic 116 and row select logic 118 both receive the timing signals 22 and provide respective column select signals $CS_1$-$CS_M$ and row select signals $RS_1$-$RS_N$. More specifically, the timing signals include a master clock signal (MSTR CLK), FRAME SYNC signal and LINE SYNC signal as shown in FIG. 2. The FRAME SYNC signal is generated once per frame, i.e., at the start of the readout of the entire focal plane array, and, e.g., signifies the start of the readout of the cell corresponding to pixel 1. The LINE SYNC signal is provided at a period corresponding to the time to readout a single row of readout cells illustrated in FIG. 2. The CS and RS signals may be simply derived from the FRAME SYNC and LINE SYNC by counting MSTR CLK signals and LINE SYNC signals, respectively. The operation of such column select logic and row select logic may be conventional in nature and accordingly will not be described in more detail herein.

The readout of the individual readout cells 100 may preferably be provided in a multiplexed manner. For example, as illustrated, the readout cells 100 may be multiplexed through output multiplexer (MUX) logic 120 and associated output buffers 106 and output switches 122. The output MUX logic 120 in turn receives the focal plane array timing signals 22, i.e., MSTR CLK, FRAME SYNC and LINE SYNC and generates output multiplex control signals $SELECT_1$, $SELECT_2$ . . . $SELECT_M$ which are provided to respective output switches 122. The signals $SELECT_1$-$SELECT_M$ may be derived in the same manner as the column select signals $CS_1$-$CS_M$ described above, for example, corresponding to such signals with a slight delay suitable to allow the outputs of the readout cells 100 to stabilize before the output is selected for readout from the circuit. Alternatively, the buffers 106 allow the signals SELECT and the CS signals to be independent from one another, for example, several columns may be simultaneously enabled by the column select signals CS with the SELECT signals being employed along with buffers 106 to control the rapid multiplexed reading out of an entire row. The signals $SELECT_1$-$SELECT_M$ control the individual output buffer 106 which is read out of the array independently of the individual readout cell activated. This gives considerable flexibility in the manner of reading out the array illustrated in FIG. 2.

Although the embodiment illustrated in FIG. 2 employs shared readout circuitry for each column, adapted for a row format of readout, it will be appreciated that a column format of readout may equally be employed. In that case, common readout circuitry would be shared by detector elements on each row and the pixel output read out in a column raster format.

Still referring to FIG. 2, compensation for nonuniformities in the detector elements in each pixel can be achieved by offset correction circuitry in each readout cell 100, described below, controlled by offset correction logic 130. As illustrated, the offset correction logic 130 receives the master timing signals 22, i.e., MSTR CLK, FRAME SYNC and LINE SYNC, as well as the binary offset correction coefficients 23. The output of circuit 130 in turn comprises timing signals, illustrated in a preferred embodiment as three timing signals SAMPLE, S-RST, and OFFSET, provided along lines 132, 134 and 136 which ensure that the offset correction circuitry is enabled in synchronism with the sampling of the individual readout cell so that the appropriate nonuniformity compensation may be achieved. In addition, the offset compensation logic 130 outputs the binary offset correction coefficients $S_0$-$S_N$ on lines 138 in synchronism with the above noted offset compensation timing signals. These signals are all provided to the individual readout cells (not shown for convenience of illustration in FIG. 2). Alternatively, as described in more detail below, the offset correction, circuitry may be shared between a number of cells 100, e.g., the cells in a row or column. In such case, the output signals from offset correction logic 130 is provided to such shared circuitry.

Additionally, the offset correction control logic 130 may provide an optional timing signal RST illustrated as being provided along line 140, for use in the optional embodiment described below in relation to FIG. 3B.

The timing signals SAMPLE, S-RST and OFFSET will generally be related to the basic array readout timing signals, CS, RS and SELECT and therefore may be derived from these signals as opposed to being independently generated by the offset correction logic 130 from the master timing signals 20 as illustrated in FIG. 2. Also, since the signal SAMPLE will typically be employed even without any offset correction logic, this signal may be supplied by separate logic circuitry from offset correction logic 130. Also, the offset correction coefficients $S_0$-$S_N$ are preferably provided from the offset coefficient memory in synchronism with the FRAME SYNC and LINE SYNC timing signals and in a manner corresponding to the sequential readout of the focal plane array. Therefore, if such coefficients are supplied in a suitably synchronized manner with such timing signals, the binary offset coefficients may be directly provided to the individual offset correction circuits without being separately synchronized with the offset timing signals by offset correction control logic 130 as illustrated in FIG. 2. Therefore, it will be appreciated that in suitable circumstances, the offset correction logic 130 may be reduced or even dispensed with and, for example, the offset correction control timing signals SAMPLE, S-RST and OFFSET provided by suitable delays from the column select, row select and SELECT signals with the offset correction coefficients $S_0$-$S_N$ being supplied directly to the individual offset correction circuits in each readout cell 100.

Figure 4:
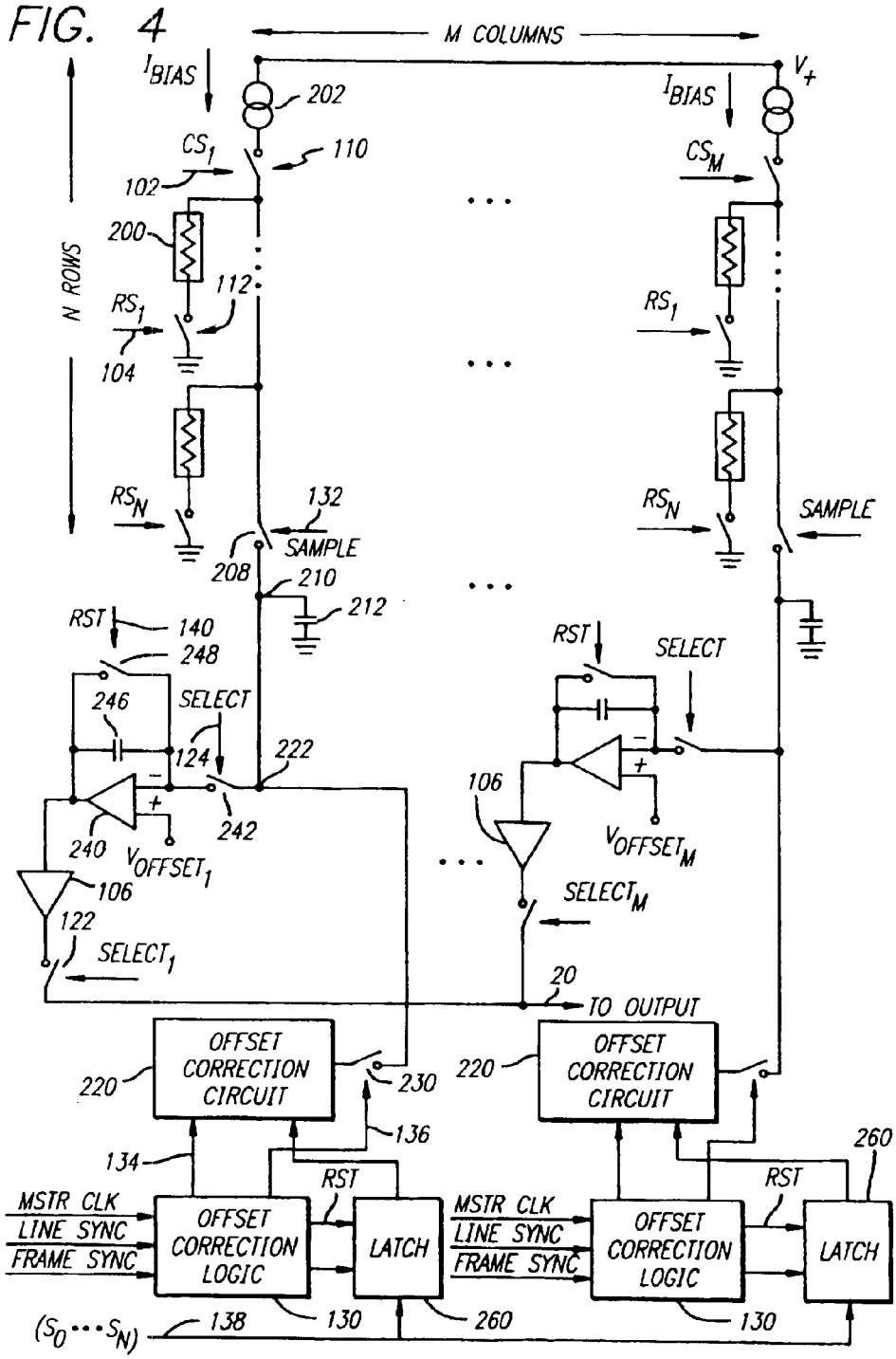
FIG. 4 is a schematic drawing illustrating a preferred embodiment of the readout circuit of the present invention incorporating a column multiplexed offset correction circuit as employed with a focal plane array of microbolometer detector elements.

The signals provided from buffers 106 are provided to an output amplifier 108 which provides the detector array output along line 20 as shown in FIG. 2. Although a single output amplifier 108 is illustrated in FIG. 2 for simplicity, in a practical implementation, an amplifier 108 may be provided for each column of the array. Such an implementation is illustrated in FIG. 4 and described below. The reference voltage input VREF to the amplifier may be selected to normalize the average detector output to a desired value for a uniform scene at a reference temperature.

The circuitry corresponding to the plurality of readout cells illustrated in FIG. 2 may preferably be implemented as a CMOS (Complimentary Metal Oxide Semiconductor) integrated circuit to take advantage of the low power consumption of such CMOS circuitry, which is highly desirable for battery powered applications, as well as the well established fabrication technology for such CMOS integrated circuits. It will be appreciated by those skilled in the art, however, that a variety of other circuit manufacturing technologies may also be employed such as bipolar, NMOS, PMOS, and BiCMOS. Also, for more expensive high performance systems, for example, high performance military applications, higher speed circuits such as gallium arsenide (GaAs) may be employed for the readout circuitry of FIG. 2. In particular, GaAs circuits may be preferred in high performance applications where the readout circuitry of FIG. 2 is employed with an array of cryogenically cooled detector elements of the photoconductor or photovoltaic type which have a fast response time.

Figure 3A:
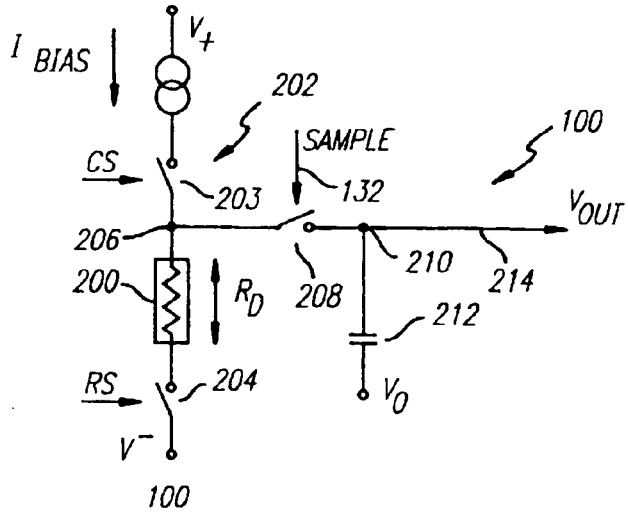
FIG. 3A is a schematic drawing illustrating the readout cell circuitry associated with a single pixel of the focal plane array of FIG. 2 in accordance with a preferred embodiment of the present invention employing current biasing of a microbolometer detector element.
Figure 3B:
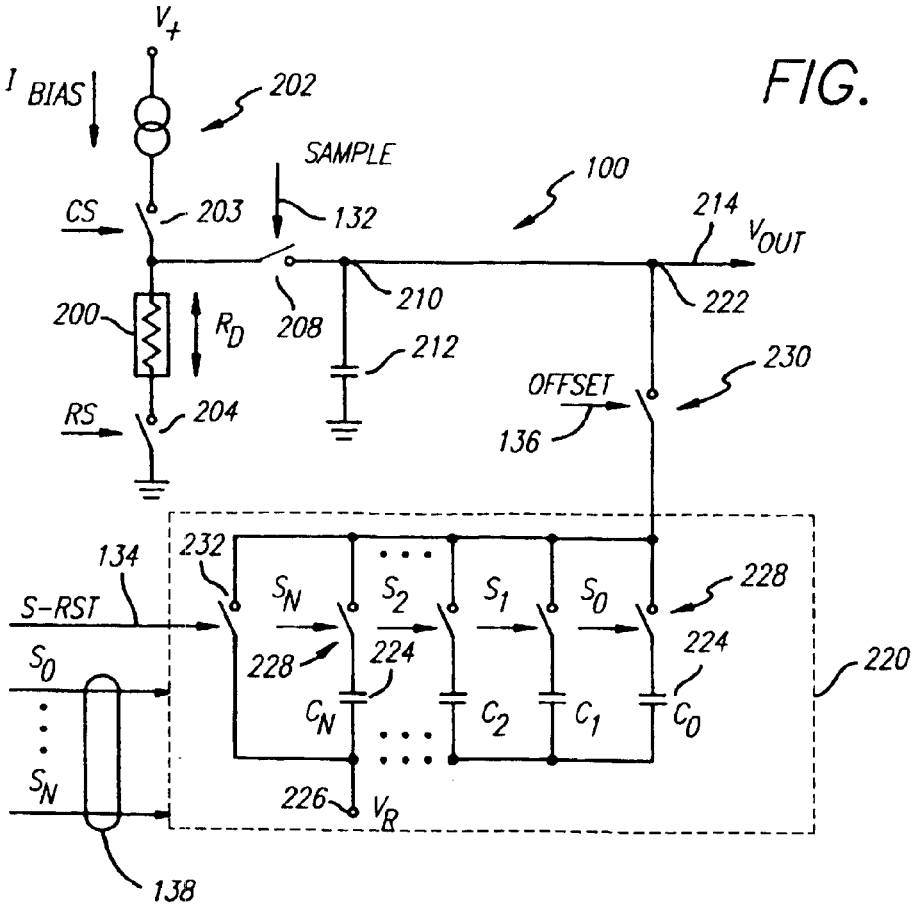
FIG. 3B is the readout circuit of FIG. 3A further including an offset correction circuit in accordance with the present invention.

Referring to FIGS. 3A and 3B, the readout cell circuitry corresponding to an individual readout cell 100 of FIG. 2 is illustrated in an implementation employing microbolometer detector elements. More specifically, FIG. 3A illustrates a readout cell employing a preferred approach to biasing of a microbolometer detector element while FIG. 3B illustrates the readout cell of FIG. 3A further including a nonuniformity correction circuit, in accordance with the present invention.

Referring first to FIG. 3A an individual readout cell 100 is illustrated incorporating therein a microbolometer detector element 200. As mentioned above, a microbolometer detector is simply a temperature sensitive resistor which changes its resistance in relation to the IR energy illuminating the detector, which IR energy raises or lowers the temperature of the detector. Sensing the detector resistance (illustrated in FIG. 3A by $R_D$) across microbolometer 200, allows the incident IR energy on the detector element to be detected. This change in resistivity must be sensed by some signal, which in turn, requires biasing the detector 200 so as to get an output signal which varies with the resistance of $R_D$.

Conventionally, microbolometer detector elements have been biased by a fixed voltage across the detector to thereby provide a variable output current from the readout cell. This use of a bias voltage is due to the direct relationship between the bias voltage and the responsivity of a microbolometer detector element. More specifically, the responsivity of a microbolometer detector element is given by:

$$R = \frac{V_{bias} \cdot \eta \cdot TCR}{G_{th} \cdot (1 + \omega^2 \cdot \tau^2)^{\frac{1}{2}}} \quad (\text{units} = V/W)$$

$$\tau = C/G_{th} \quad (\text{units} = \text{sec})$$

where $V_{bias}$ is the detector bias voltage; $\eta$ is the detector absorptivity; TCR is the detector temperature coefficient of resistance; $G_{th}$ is the detector thermal conductance to the readout IC; $\omega$ is the angular frequency; C is the thermal mass (heat capacity); and $\tau$ is the thermal time constant. This expression multiplied by the amount of incident IR energy reaching the microbolometer structure gives the voltage response of the detector. For a given detector design and fabrication, the absorptivity, TCR and thermal conductance are fixed and the detector responsivity is maximized by increasing the bias voltage ($V_{bias}$) across the detector.

Although voltage biasing of the microbolometer detector elements is satisfactory in terms of providing a signal related to the incident IR energy on the microbolometer element, since the output signal is a current signal normally such current signal needs to be converted to a voltage signal before being converted from analog to digital form for subsequent signal processing. Such current to voltage conversion in turn requires additional circuitry which, if configured on the focal plane array itself, can be a disadvantage. On the other hand, if the current signal is transferred off the focal plane array integrated circuit prior to conversion to a voltage signal, then off focal plane noise may cause problems in detecting very small signals.

In the approach illustrated in FIG. 3A, a constant current bias ($I_{bias}$) is provided to the microbolometer element in place of a voltage bias. Since the voltage across the microbolometer detector element 200 is given by:

$$V_D = I_{bias} \times R_D$$

and since $I_{bias}$ is maintained constant, the change in microbolometer detector element 200 resistance ($R_D$) will be represented by the voltage drop across the element, i.e. $V_D$. This signal may thus be amplified and analog-to-digital converted without intervening conversion circuitry.

More specifically, referring to FIG. 3A, the readout cell circuitry includes a constant current source 202 which provides the bias current $I_{bias}$. One preferred implementation of such a constant current source 202 will be described below in relation to FIG. 9 for a MOS implementation of the readout circuit. Although the constant current source 202 is shown as coupled directly to the positive voltage source $V_+$ in FIG. 3A, as better illustrated in FIG. 2, the readout cell is coupled to the voltage source via a column select switch 110 which will only be activated when readout of the particular column in which the readout cell 100 resides is desired. An additional column select switch 203 may optionally be provided within readout cell 100. A row select switch 204 is also provided, which receives the row select signal (RS) which is activated when readout of the specific row corresponding to the readout cell 100 is desired.

Thus, when the appropriate column select and row select strobes are presented, the constant current source 202 will be connected to the microbolometer element 200 and the row select switch 204 will be closed so that a voltage appears at node 206 corresponding to the voltage drop $V_D$ across the microbolometer element. A short time after the closing of the column select and row select switches corresponding to the specific readout cell 100 are completed, sufficient to give time for the detector sample voltage $V_D$ to stabilize, the control signal SAMPLE is applied to sampling switch 208. This, in turn, causes a voltage to appear at node 210 which, given sufficient time to settle, will correspond to the sampled value of the microbolometer voltage $V_D$.

The sample and hold capacitor 212 is charged to $V_D + V^- V_0$. It will be appreciated by those skilled in the art that the voltages $V^-$ and $V_0$ can have the same value and that these voltages, for the convenience of illustration, can be zero volts relative to the $V^+$ voltage source. The sample and hold capacitor 212 is then charged to the sample value of the microbolometer voltage $V_D$. This held voltage is then provided as the output of the readout cell indicated as $V_{out}$ on line 214 in FIG. 3A.

Referring to FIG. 3B, the readout cell 100 is illustrated employing offset correction circuitry for compensating for nonuniformities in the detector elements in the array of FIG. 2. The readout circuitry of FIG. 3B common to that of FIG. 3A operates in the manner described above and a detected voltage $V_D$ is provided at node 210 as described above. This voltage will vary from pixel to pixel, however, even for a uniform scene and hence uniform IR input to all the microbolometer elements 200 due to inherent nonuniformities in processing of the microbolometer array. Such nonuniformities are compensated for by offset correction circuit 220 which is coupled to node 222 and causes a suitable amount of charge to be subtracted from (or added to) sample and hold capacitor 212 such that an offset corrected output voltage $V_{out}$ is provided. That is, the offset correction circuit 220 provides a corrected output voltage $V_{out}$ at node 222 given by the following:

$$V_{out}=V_D\pm V_{OC}+V^{-}-V_0=V_D\pm V_{OC} \text{ if } V^{-}=V_0=0$$

where $V_{OC}$ is the voltage offset correction due to circuit 220.

In a preferred implementation, as illustrated in FIG. 3B, the offset correction circuit 220 includes a plurality of parallel coupled capacitors 224. Capacitors 224 are coupled between output node 222 and a reference node 226 maintained at an offset reference voltage $V_R$, via respective switches 228. Switches 228 receive the binary offset correction coefficients $S_0$-$S_N$ described above to select the specific capacitors 224 which are coupled into the offset correction circuit 220. Each capacitor 224 which is coupled to node 222 by virtue of the corresponding switch 228 being closed will subtract (or add) a voltage from (or to) node 222 corresponding to the difference between $V_D$ and $V_R$ and the capacitance of the capacitor 224. The respective capacitances of capacitors 224 are illustrated in FIG. 3B as $C_0$-$C_N$ and are preferably chosen such that each capacitance is double that of the previous capacitor in the network; i.e. the capacitance of the Nth capacitor is $2^N C_0$. That is, the capacitors $C_0$-$C_N$ have the following values:

$$C_0,\ 2C_0,\ 4C_0 \ldots 2^N C_0.$$

Figure 7:
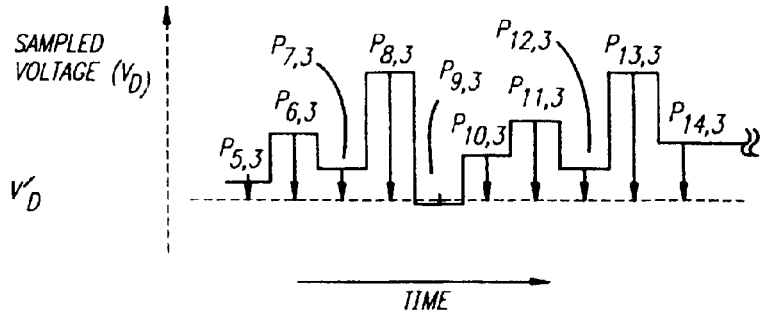
FIG. 7 is a graphical representation of an example of offset correction provided for several pixels of the focal plane array in accordance with the present invention.

Thus, for example, for N=4, the offset compensation network will have 16 discrete and uniform offset values corresponding to the binary value of the four offset coefficients $S_0$-$S_N$. By adjusting these capacitance values as well as optionally the voltage $V_R$, the discrete step size of voltage correction corresponding to each capacitor which is switched into the network may be controlled. In this way, a substantially uniform signal can be provided at $V_{out}$ for each detector element when the detectors are uniformly illuminated, thereby correcting for nonuniformities in the individual detector elements 200. This stepwise correction of detector voltages to a uniform value for a uniform IR scene is illustrated in FIG. 7, discussed below.

As further shown in FIG. 3B, the offset correction circuit 220 is coupled to the node 222 through switch 230 which is responsive to the signal OFFSET provided along line 136. The control signal offset maintains the OFFSET correction circuit 220 disconnected from node 222 until the sampled voltage $V_D$ stabilizes at node 210 and the microbolometer detector is disconnected from node 210 by opening the sample switch 208. The signal OFFSET provided along line 136 then closes switch 230 to couple the offset correction network circuit 220 to node 222 and thereby subtract (or add) the desired charge from sample and hold capacitor 212 to provide the offset corrected voltage $V_{out}$ along line 214. This offset switch 230 is momentarily closed and then opened to subtract (or add) charge from the sample and hold capacitor. It will be appreciated by those skilled in the art that the offset switch 230 is held closed a sufficient time to allow the voltage at node 222 to settle.

As further shown in FIG. 3B, the offset correction circuit 220 receives control signal S-RST provided along line 134 to reset switch 232. Reset switch 232 serves to discharge (or precharge) capacitors 224 to the offset reference voltage $V_R$ prior to coupling the offset correction circuit 220 to node 222. The reset is primarily necessary to remove any residual charge from capacitors 224 in situations where circuit 220 is shared between plural readout cells or to reset these capacitors and remove any residual charge from the previous sample of the detector voltage.

Figure 3C:
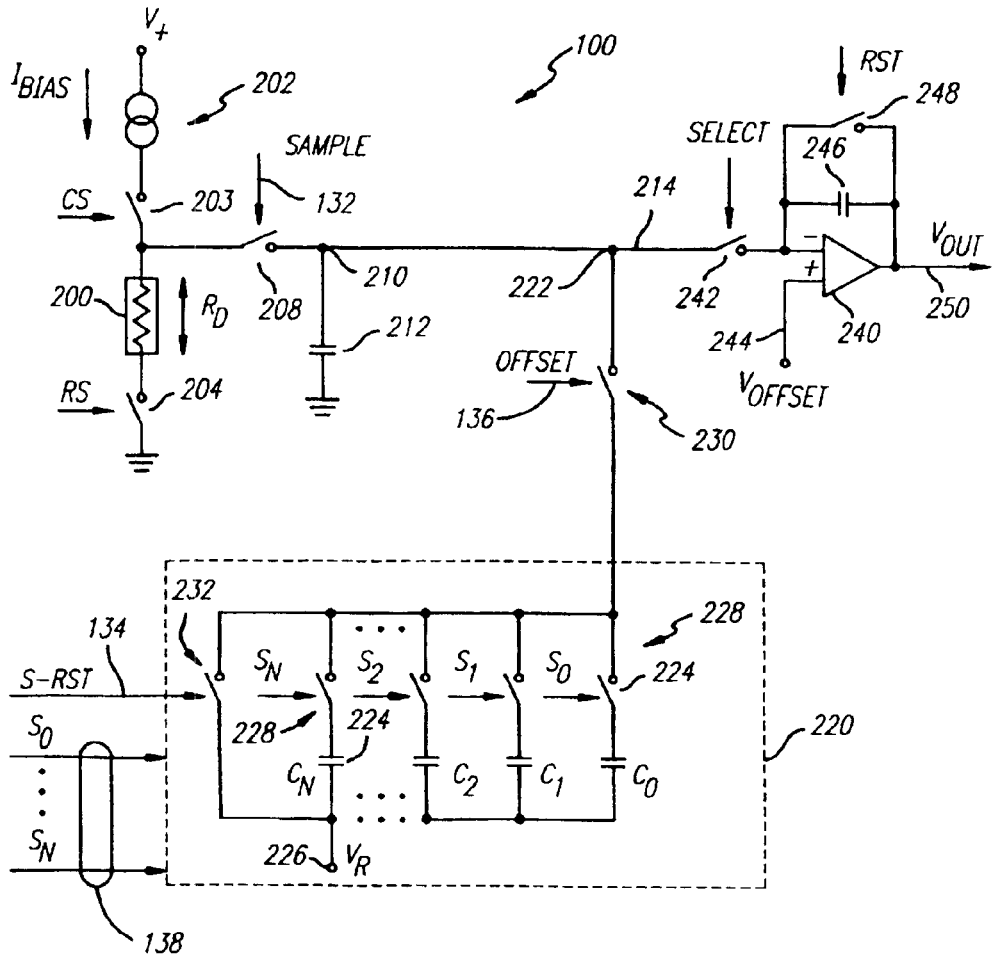
FIG. 3C is the readout circuitry of FIG. 3B further including an amplification circuit in accordance with the present invention.

Referring to FIG. 3C, a modified readout cell 100 is illustrated which provides additional offset correction capabilities. In FIG. 3C, the components with like numerals correspond to the same structure as described above in relation to FIGS. 3A and/or 3B.

The additional structure provided in the readout cell 100 of FIG. 3C is an output amplifier 240 which is coupled to node 222 at one input thereof via a select switch 242. The other input to the differential amplifier 240 is coupled to an adjustable voltage $V_{offset}$ provided along line 244. The differential amplifier 240 includes a feedback loop including feedback capacitor 246 and a reset switch 248 which receives the control signal RST, coupled in parallel with the feedback capacitor. The feedback capacitor 246 as well as the voltage $V_{offset}$ can be adjusted to vary the gain of the amplifier 240 as well as to remove a DC voltage level from the voltage at node 222. More specifically, the gain of the amplifier 240 is proportional to the ratio of the capacitance of the sample and hold capacitor 212 so that of the feedback capacitor 246 (i.e. $C_{SH}/C_{FB}$). The voltage amplified in turn will be the difference between the corrected voltage at node 222 (i.e. $V_D\pm V_{OC}$) and the voltage along line 244 (i.e., $V_{offset}$) $V_{offset}$ may be adjusted to remove variations in $I_{bias}$ or temperature variations in the detector unrelated to incident IR radiation. $V_{offset}$ may be adjusted during initial calibration of the detector or during subsequent calibrations under microprocessor control. Thus, the amplified output signal $V_{out}$ is given by the following:

$$V_{out}=-(C_{SH}/C_{FB})\ (V_D\pm V_{OC}-V_{offset})$$

The amplified output voltage $V_{out}$ is supplied along line 250 as illustrated in FIG. 3C.

The amplifier 240 along with the feedback capacitor 246 and adjustable voltage $V_{offset}$ thus provide additional ability to correct for nonuniformities and other undesired variations introduced in the readout cell 100 after fabrication.

Figure 8:
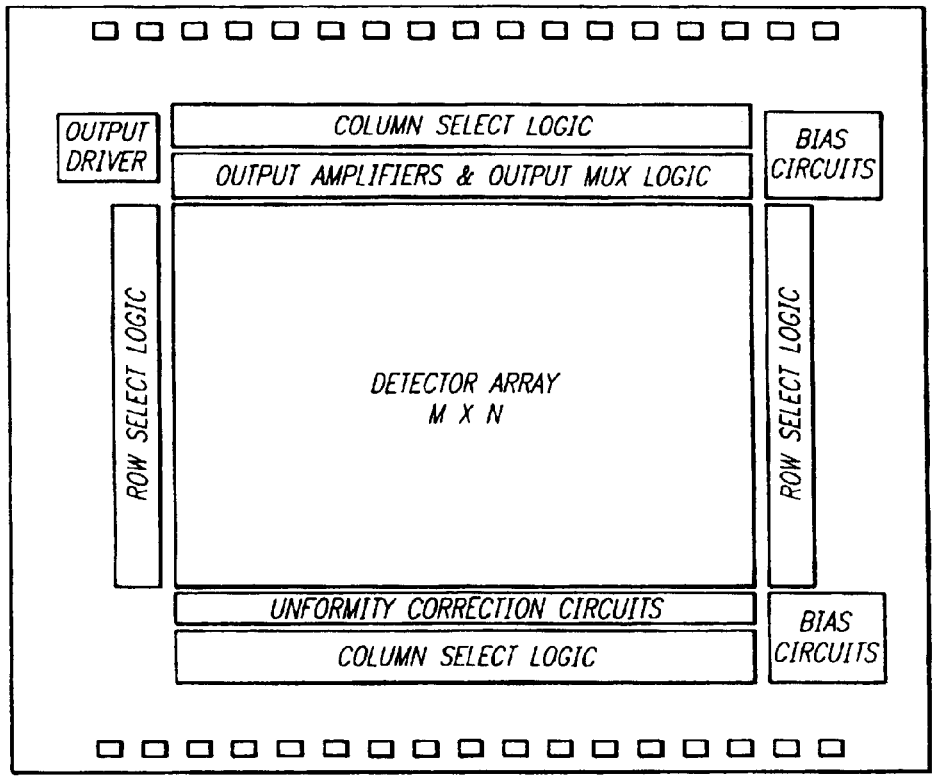
FIG. 8 is a schematic drawing of layout of the focal plane array and readout circuitry in accordance with the preferred embodiment of the present invention.

Referring to FIG. 4, an alternate embodiment of the readout circuitry for the focal plane array is illustrated employing shared offset correction and readout circuitry for each column of the N×M array of detector elements 200 (only two columns are illustrated for clarity of illustration). The embodiment of FIG. 4 may generally be preferred in applications where the amount of integrated circuit area available for the readout circuitry immediately adjacent the individual detector elements 200 is limited. For example, in an embodiment employing the microbridge microbolometer elements 200, the fabrication of such microbridge structures makes it desirable to minimize the amount of readout circuitry underlying or immediately adjacent to the individual detector elements 200. In this situation, the embodiment of FIG. 4 allows the readout and offset correction circuitry to be primarily located outside of the array of detector elements 200 as generally illustrated in FIG. 4. Although the column select logic, row select logic, output MUX logic and offset correction logic discussed above in relation to FIG. 2 is not illustrated in FIG. 4, it will be appreciated from the discussion in relation to FIG. 2 that such circuitry may also be configured outside of the array of detector elements 200 in the embodiment of FIG. 4. One preferred example of such a layout on an integrated circuit is illustrated in FIG. 8.

The embodiment of FIG. 4 provides offset correction circuitry and readout circuitry which is shared in a time multiplexed manner for each column of the N by M array of detector elements 200. This time multiplexed operation of the readout circuitry and offset correction circuitry of FIG. 4 may be best appreciated in conjunction with an exemplary timing sequence as illustrated in FIG. 5A-5K.

Figures 5A, 5B, 5C, 5D, 5E, 5F, 5G, 5H, 5I, 5J, 5K:
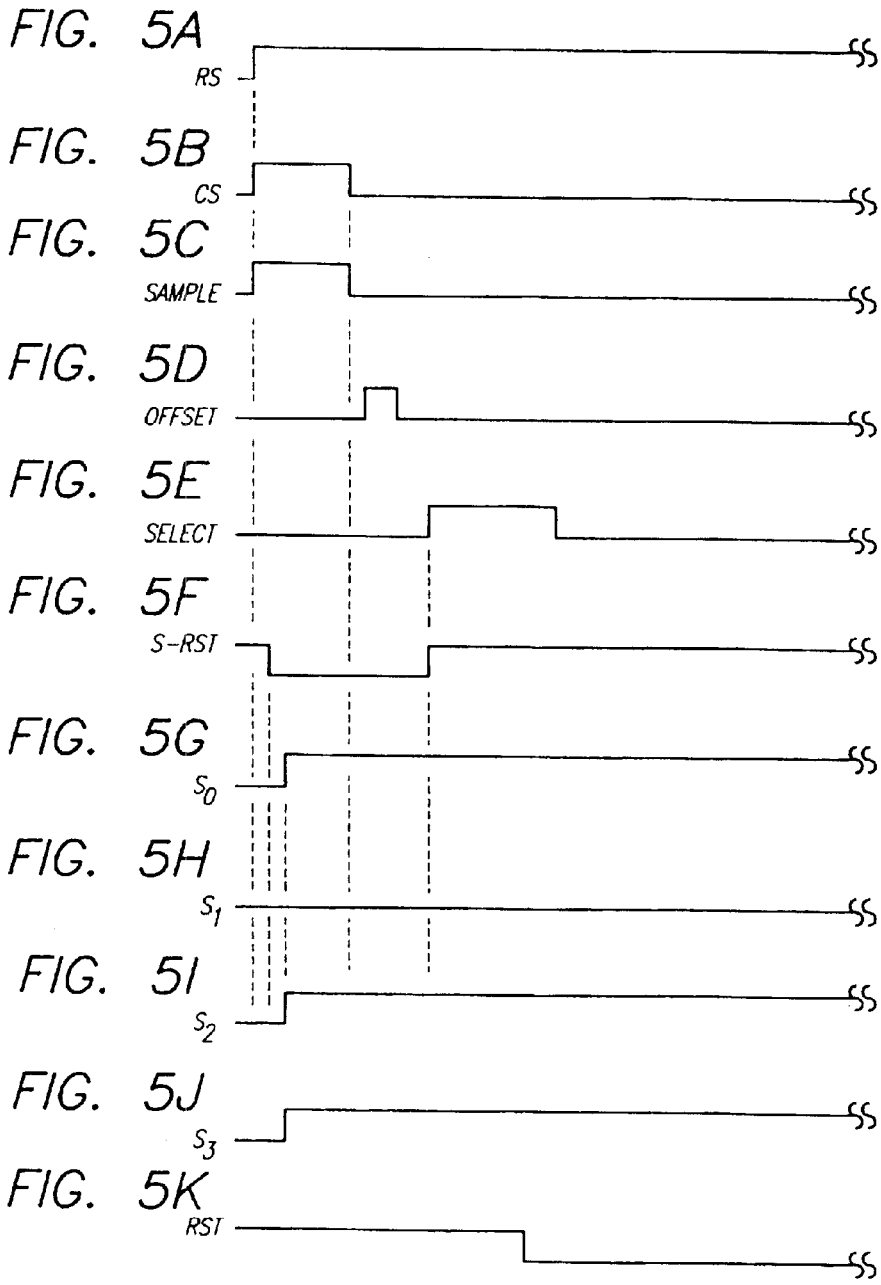
FIGS. 5A-5K and 6A-6G are timing diagrams illustrating the timing signals employed in the readout circuit of FIG. 4.
Figure 6A:
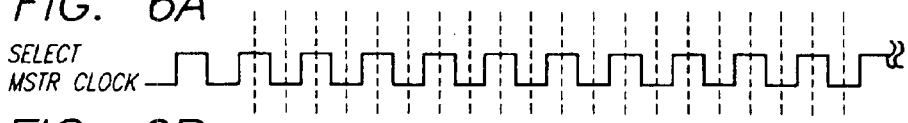
Figure 6B:
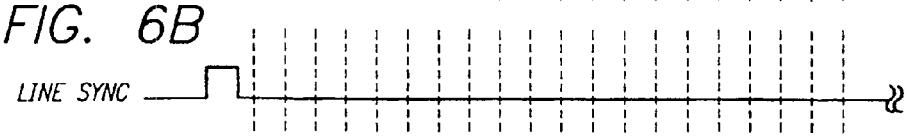
Figure 6C:
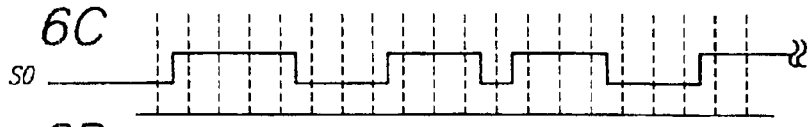
Figure 6D:
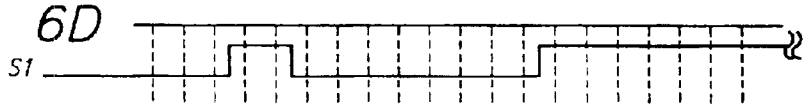
Figure 6E:
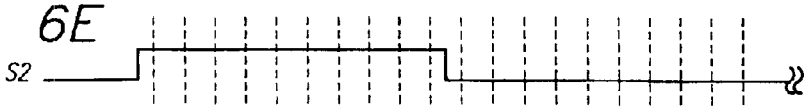
Figure 6F:
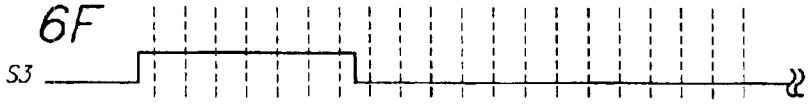
Figure 6G:
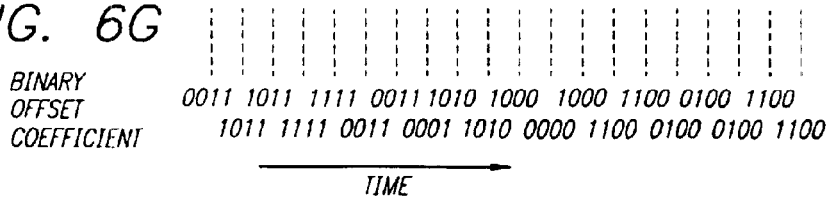

Referring to FIG. 4 and FIGS. 5A-5K, as the respective CS and RS signals are supplied to the switches 110 and 112 in a given column and the signal SAMPLE provided along line 132 is asserted, the detected voltage at the corresponding detector element 200 appears at node 210. After the detected voltage $V_D$ at node 210 has stabilized, the signal SAMPLE is deasserted holding $V_D$ at node 210, and hence node 222, through sample and hold capacitor 212. The signal OFFSET provided along line 136 from offset correction logic 130 is then asserted which closes switch 230 coupling the offset correction circuit 220 to node 222 of the readout circuitry. Offset correction circuit 220 subtracts (or adds) charge from sample and hold capacitor 212 to provide the offset corrected voltage at node 222 in a manner as described above in relation to FIG. 3B. (At some point prior to assertion of the OFFSET signal, the values on the capacitors in offset correction circuit 220 will have been reset to the offset reference voltage by assertion of S-RST along line 134, as shown in FIG. 5F). The appropriate value of the offset correction provided by offset correction circuit 220 will be controlled by the offset correction data bits as $S_0$-$S_N$ which are provided along line 138 and latched into the offset correction circuit switches by latch 260 under control of offset correction logic 130. In the example of FIGS. 5G-5J, the binary offset coefficient is 1011 corresponding to the second switch open and the others closed in the offset correction circuit 220. Such offset correction coefficients will be selected in a manner to adjust the voltage at node 222 to a desired corrected output voltage which compensates for the nonuniformities in the detector elements 200.

The voltage on node 222 is then supplied to the output amplifier 240 by assertion of the signal SELECT provided along line 124 (from offset correction logic 130) and applied to switch 242. At this time, the RST signal input to the switch 248 will be deasserted allowing the gain of amplifier 240 to be set by a feedback capacitor 246 with the amplified value being determined by the difference between the voltage on node 222 and $V_{offset}$. $V_{offset}$ in turn in general will be the same for each column or will be set differently in each column in the array, for example, to adjust for differences in bias current $I_{bias}$ in each column. The output of the amplifier 240 is supplied to output buffer 106 which in turn supplies the offset corrected output voltage along output line 20 when switch 122 is closed under the control of the signal SELECT provided by output MUX logic 120 (referring to FIG. 2). The SELECT signals applied to switches 242 and 122 for a given column may be the same signals or may be different if multiple columns are enabled at the same time and then sequentially read out of via output buffers 106.

The above described readout sequence in relation to FIGS. 4 and 5A-5K corresponds to readout of a single pixel of the focal plane array. It will be appreciated this sequence is repeated with the offset coefficient values $S_0$-$S_N$ varying to provide offset correction separately for each detector element in the array. For example, referring to FIGS. 6A-6G, the changing values of S0-S3 are illustrated along with the signals LINE SYNC and MSTR CLK, for a series of 20 pixels. As shown, the provision of the offset coefficients $S_0$-$S_3$ provided from the offset coefficient memory (shown in FIG. 1) provides 20 separate binary offset coefficient values corresponding to the 20 consecutive pixels read out of the array by the readout circuit of FIG. 4. As illustrated by the LINE SYNC signal in 6(b) beginning the sequence of 20 pixels, such 20 pixels may correspond to the first 20 pixels in a given row of the focal plane array. Since the coefficients are latched, as discussed in relation to FIG. 4, a new coefficient value may be provided at every MSTR CLK half period even though the readout sequence described above may be delayed by several clock cycles.

Referring to FIG. 7, the corresponding discrete offset corrections provided by 10 distinct offset correction coefficients for 10 consecutive pixels in a row of the focal plane array are illustrated. For example, as illustrated by the values $P_{5,3} \ldots P_{14,3}$ these may correspond to 10 pixels in row 3 of the array ranging from the 5th to 14th pixel. As may be seen, the different offset coefficients provide discretely varying corrections to the analog detection voltage ($V_D$) which approximately adjust the sampled and held voltage to the normalized value illustrated by the dashed line in FIG. 7. Each of these pixels is presumed to be illuminated by a uniform IR input corresponding to a uniform scene imaged by the focal plane array. Therefore, a voltage $V_D'$ illustrated by the dashed line in FIG. 7 corresponds to a desired uniform voltage from each pixel in response to the uniform scene after the discrete offset correction.

Figure 9:
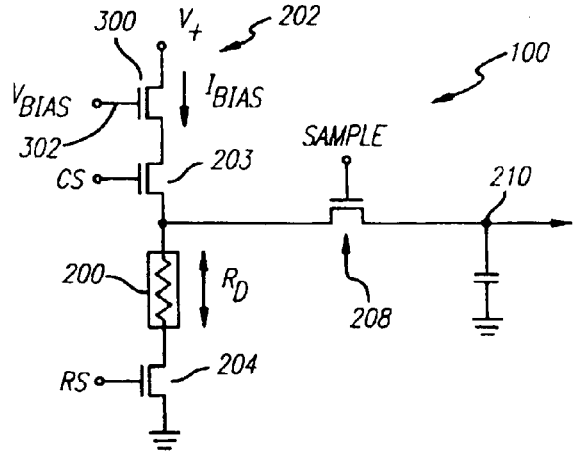
FIG. 9 is a schematic drawing of a MOSFET current source biasing circuit employed in the readout circuit of FIGS. 3A-3C and 4 in accordance with the present invention.

Referring to FIG. 9, an embodiment of the bias current source 202 is illustrated in a preferred MOS embodiment of the readout cell illustrated in FIG. 3A.

As shown in FIG. 9, the bias current $I_{bias}$ is provided by a MOS transistor 300 which received a fixed bias voltage $V_{bias}$ provided along line 302 to the gate thereof. The MOS transistor 300 may be operated in the saturation region such that the current $I_{bias}$ is substantially constant despite variations in the detector voltage $V_D$ developed across $R_D$. The switches 203, 204 and 208 described above in relation to FIG. 3A are also preferably fabricated as MOS transistors with the corresponding signals CS, RS and SAMPLE applied to the gates thereof.

Accordingly, it will be appreciated that the circuit of FIG. 9 provides an easily implemented implementation of the circuitry described above in relation to FIG. 3A suitable for a MOS or CMOS implementation. Other implementations including CMOS, BiPOLAR or BiCMOS may also be employed, however, as will be appreciated by those skilled in the art.

Figure 10:
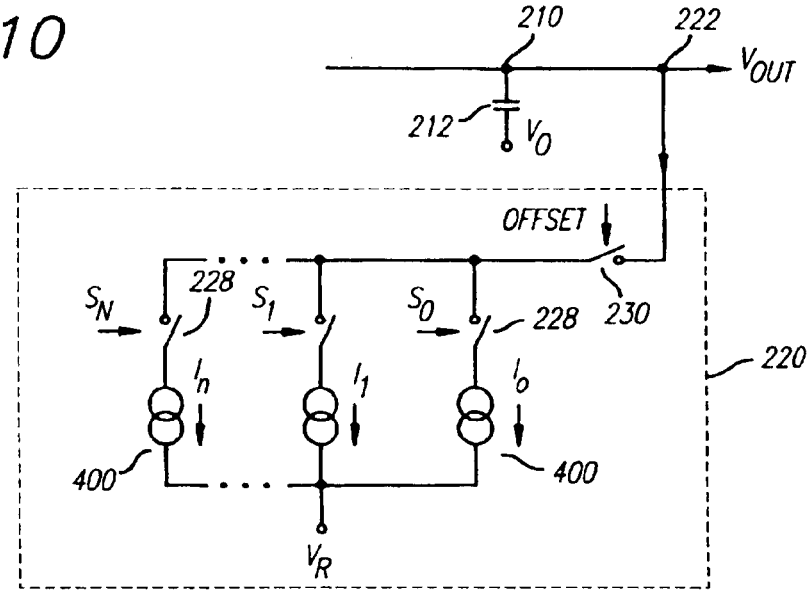
FIG. 10 is an alternate embodiment of the offset correction circuit illustrated in FIG. 3 employing a network of fixed current sources.

Referring to FIG. 10, an alternate embodiment of the offset correction circuit 220 is illustrated. The embodiment of FIG. 10 employs a plurality of constant current sources 400 which are coupled in parallel and which are selectively connected to the node 222 (described in more detail above in relation to FIGS. 3B and 3C) by switches 228. As in the case of the embodiment described above in relation to FIGS. 3B and 3C, the switches 228 are selectively activated by the signals $S_0$-$S_N$ which correspond to the stored offset correction coefficients.

The operation of the embodiment of FIG. 10 and the result achieved is substantially the same as that described above in relation to FIG. 3B. That is, in response to the binary offset correction coefficients supplied from the offset coefficient memory (shown in FIG. 1), the signals $S_0$-$S_N$ are applied to switches 228 to open or close the respective switches to couple the selected constant current sources 400 into the offset correction circuit 220. The constant current sources coupled into the circuit will draw a fixed amount of current from the sample and hold capacitor 212; i.e. a fixed amount of charge per unit of time. The switches 228 are closed for a time period corresponding to the desired amount of charge to be removed from capacitor 212 to correct the voltage to compensate for the offsets. The offset switch 230 is then opened and the corrected voltage at node 222 is provided as $V_{out}$ as in the case of the previously described embodiment.

It will be appreciated that the embodiment of FIG. 10, while providing the same basic operation as the embodiment of FIG. 3B, potentially can provide even finer discrete adjustments to the analog detection signal $V_D$ by adjusting the time which the switches 228 are held closed, which time may be any integral number of the period of the MSTR CLK signal.

Figure 11:
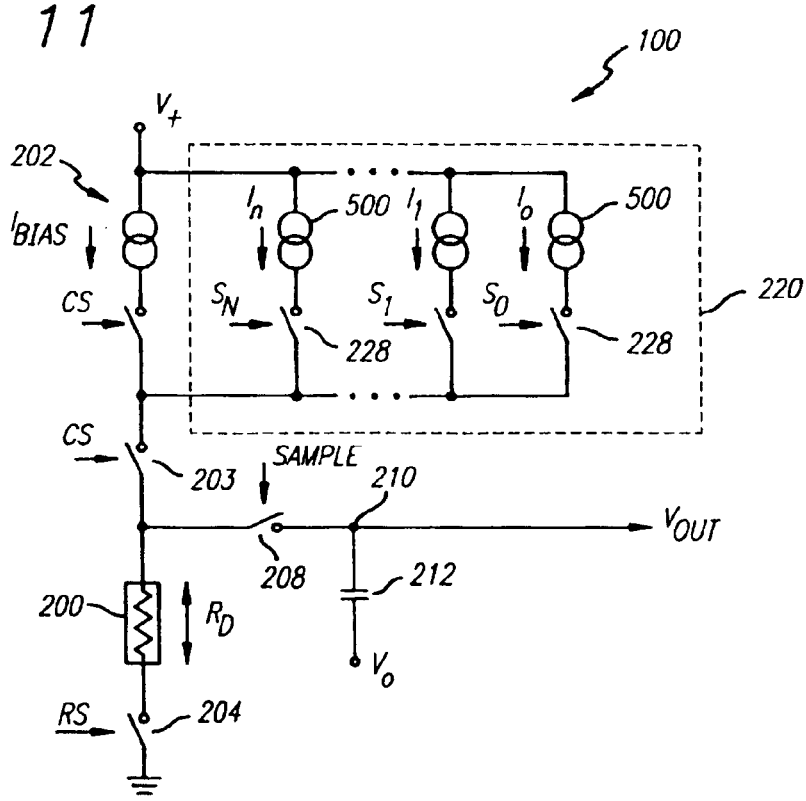
FIG. 11 is a schematic drawing of another alternate embodiment of the offset correction circuit of FIG. 3 employing a network of fixed current sources switchably connected between the voltage source and the microbolometer detector element.

Referring to FIG. 11, yet another embodiment of the offset correction circuit of the present invention is illustrated. The embodiment of FIG. 11 is primarily adapted for use with a microbolometer uncooled type focal plane array. In the embodiment of FIG. 11, offset corrections to the sampled voltage across the microbolometer 200 are provided by adjusting the bias current $I_{bias}$. This adjustment to $I_{bias}$ is achieved by coupling additional constant current sources 500 in parallel with primary constant current source 202. More specifically, since the voltage across the microbolometer detector element 200 is given by $$V_D=I_{bias}\times R_D$$

differences in $R_D$ may be adjusted by adding more current to $I_{bias}$ by switching into the readout circuit additional bias current sources 500. As in the previously described embodiments, to be compatible with a binary representation of the offset correction value required in terms of the coefficients $S_0$-$S_N$, preferably the bias currents $I_0$-$I_N$ will be constructed in such a manner as to provide a repeated doubling of bias current which can be coupled into the circuit. That is, the N bias currents $I_0$-$I_N$ will be, respectively:

$$I_0,\ 2I_0,\ 4I_0,\ 8I_0,\ \ldots\ 2^N I_0.$$

Figure 12:
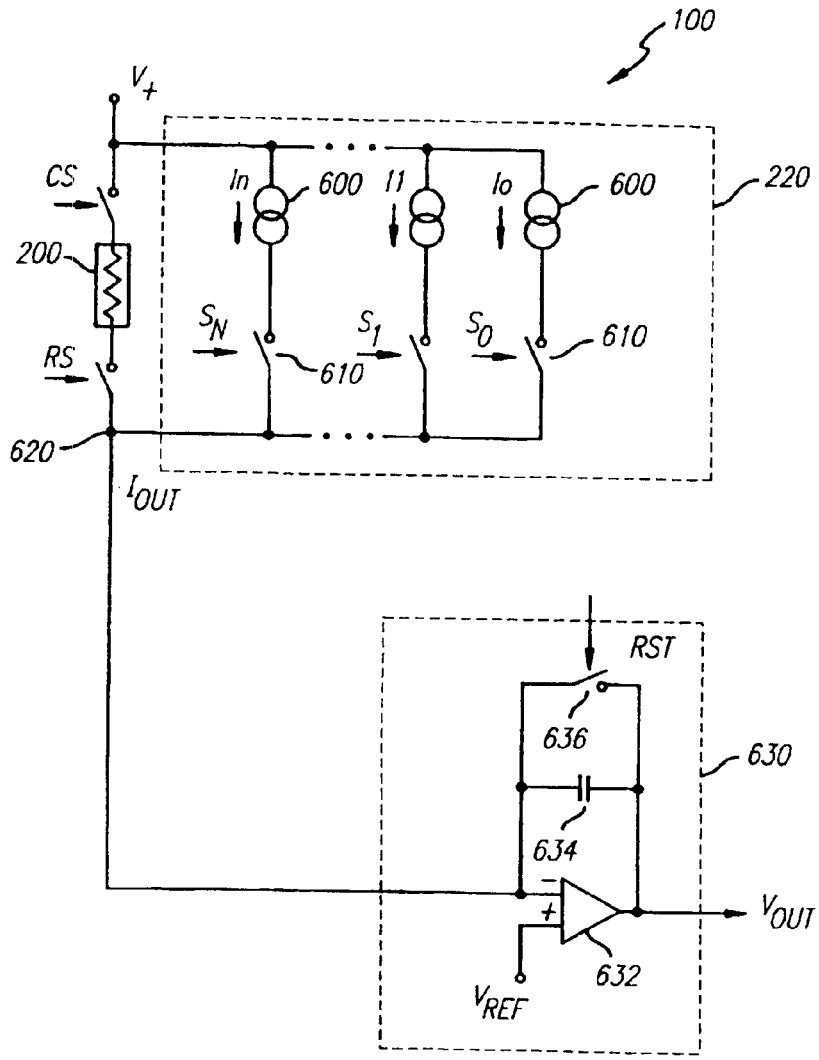
FIG. 12 is yet another alternate embodiment of the uniformity correction circuit of the present invention employing voltage biasing of the microbolometer detector elements.

Referring to FIG. 12, yet another embodiment of a readout cell 100 is illustrated employing offset correction circuitry. The embodiment of FIG. 12 employs a voltage biasing of the microbolometer detector element 200 as opposed to the current biasing approach described in the previous embodiments. In the embodiment of FIG. 12, a fixed bias voltage $V_{bias}$ ($V_{bias}=V^+-V_{ref}$) is provided across the microbolometer detector element 200. The detected signal is then provided by the current through the detector $I_D$ given by:

$$I_D=V_{bias}\times R_D.$$

Nonuniformities in the detector elements 200 will give rise to a difference in the detector current $I_D$ between detector elements in response to a uniform temperature scene. In the embodiment of FIG. 12, the deviation in the analog detected current due to such ununiformities is compensated by adding additional currents $I_0$-$I_N$ provided from constant current sources 600. These constant current sources 600 are selectively coupled into the circuit 220 by switches 610 which receive the control signals $S_0$-$S_N$, which correspond to stored binary offset correction values in the same manner as the above described embodiments. A corrected detector current is provided at node 620 indicated as $I_{out}$ in FIG. 12. In order to be readily compatible with a binary representation of the offset correction value for each detector element, the constant current sources 600 are preferably designed to have a increasing value as follows:

$$I_0,\ 2I_0,\ 4I_0,\ 8I_0\ \ldots\ 2^N I_0.$$

The output current from node 620 is provided to a circuit 630 for converting the output current to an output voltage $V_{out}$. In the illustrated embodiment of FIG. 12, the circuit 630 is a reset integrator operating as a form of transimpedence amplifier. The circuit 630 includes a differential amplifier 632 with the offset corrected current $I_{out}$ provided to a first input thereof and a reference voltage $V_{ref}$ coupled to the second input thereof. The feedback in turn is provided by a feedback capacitor 634. A reset switch 636 is also provided to reset the amplifier 632, in particular where circuit 630 is shared between a plurality of detector elements in a time multiplexed manner.

It will be appreciated by those skilled in the art that additional embodiments of a current to voltage conversion circuit 630 may be implemented including a more conventional transimpedence circuit employing a feedback resistor. The embodiment illustrated in FIG. 12 is preferred, however, for VLSI implementations due to the difficulty in implementing large resister values accurately and uniformly in VLSI circuits.

While the foregoing detailed description of the invention has been provided in terms of specific embodiments and specific circuit implementations, it will be appreciated by those skilled in the art that such are merely illustrative in nature and a variety of modifications may be made while remaining within the scope of the present invention. Accordingly, the present invention should not be limited to the aforedescribed preferred embodiments.

What is claimed is:

1. An infrared imaging system, comprising:

an infrared focal plane array comprising:

a plurality of infrared detector elements arranged in an array;

a readout circuit electrically coupled to the plurality of detector elements and comprising means for biasing the plurality of detector elements so as to provide separate detection signals corresponding to each detector element in the array, in response to incident infrared radiation and means for separately correcting offsets in the detection signals [Provided] *provided* from the plurality of elements in the detector array to compensate for nonuniformities in the detector elements, wherein said means for correcting comprises:

a correction circuit including a plurality of parallel connected circuit elements; and means for selectively electrically connecting said circuit elements into the detector readout circuit in response to stored offset correction values; and output means for providing the corrected detection signals as an output of the focal plane array;

means for storing a plurality of offset correction values corresponding to the plurality of detector elements; and means for providing the offset correction values to said means for correcting.

2. An infrared imaging system as set out in claim 1, wherein said plurality of parallel connected circuit elements comprise a plurality of capacitors.

3. An infrared imaging system as set out in claim 2, wherein said capacitors have capacitances of $2^N C_0$, respectively, where $C_0$ is a fixed capacitance and N is a nonnegative integer.

4. An infrared imaging system as set out in claim 3, wherein there are four capacitors having respective capacitances of $C_0$, $2C_0$, $4C_0$ and $8C_0$.

5. An infrared imaging system as set out in claim 1, wherein said means for selectively connecting comprises a plurality of switches, equal in number to said plurality of parallel connected circuit elements and connected in series therewith.

6. An infrared imaging system as set out in claim 1, wherein said offset correction values are binary values and wherein said means for storing comprises a digital memory.

7. An infrared imaging system as set out in claim 6, wherein said digital memory stores a separate binary offset correction value for each detector element in the array.

8. An infrared imaging system as set out in claim 1, wherein said plurality of detector elements are arranged in a plurality of rows and columns and wherein said means for correcting comprises a separate offset correction circuit for each column and wherein said means for providing said offset correction values provides said offset correction values in a time multiplexed manner to said means for correcting.

9. An infrared imaging system as set out in claim 1, wherein said plurality of parallel connected circuit elements comprise a plurality of constant current sources.

10. An infrared imaging system as set out in claim 9, wherein said current sources provide substantially constant currents of $2^N I_0$, respectively, when coupled into said readout circuit by said means for selectively connecting, where $I_0$ is a fixed current value and N is a nonnegative integer.

11. An infrared imaging system as set out in claim 10, wherein there are four constant current sources providing substantially constant currents of $I_0$, $2I_0$, $4I_0$ and $8I_0$.

12. An infrared imaging system as set out in claim 1, wherein said array of detector elements and said readout circuit are formed as a single monolithic integrated circuit chip.

13. An infrared imaging system as set out in claim 1, wherein said plurality of detector elements comprise microbolometer detector elements.

14. An infrared imaging system as set out in claim 13, wherein said means for biasing comprises a constant current source coupled to said microbolometer detector elements.

15. An infrared imaging system as set out in claim 13, wherein said means for biasing comprises a fixed voltage source coupled to said microbolometer detector elements.

16. An infrared imaging system as set out in claim 15, wherein said means for correcting comprises a plurality of substantially constant current sources selectively coupled to said voltage source and in parallel with said microbolometer detector elements.

17. An infrared imaging system as set out in claim 16, wherein said means for correcting further comprises a plurality of switches coupled in series with respective constant current sources.

18. An infrared imaging system as set out in claim 17, wherein said offset correction values comprise an on or off signal supplied to each of said switches.

19. An infrared imaging system as set out in claim 1, wherein said output means comprises one or more output buffers.

20. An infrared imaging system as set out in claim 1, wherein said focal plane array further comprises a differential amplifier with first and second inputs wherein the first input is electrically connected to the readout circuit so as to receive the detection signals and wherein the second input is connected to an adjustable reference voltage.

21. An infrared imaging system as set out in claim 1, further comprising timing means for providing focal plane timing signals to said readout circuit.

22. An infrared imaging system as set out in claim 21, wherein said readout circuit further comprises offset correction logic means for controlling the means for correcting in response to said timing signals provided from the timing means.

23. An infrared imaging system as set out in claim 22, wherein said offset correction logic means receives said offset correction values from said means for storing and provide them to said means for correcting in response to said timing signals.

24. An infrared imaging system as set out in claim 1, further comprising means, coupled to said output means, for analog to digital converting the corrected detection signals and providing corresponding image data for each detector element.

25. An infrared imaging system as set out in claim 24, further comprising a memory for temporarily storing image data corresponding to all the detector elements of the array.

26. An infrared imaging system, comprising:

an infrared focal plane array comprising:

a plurality of infrared detector elements arranged in an array;

a readout circuit electrically coupled to the plurality of detector elements and comprising a plurality of readout cells equal in number to the plurality of detector elements, means for biasing the plurality of detector elements so as to provide separate detection signals corresponding to each detector element in the array, in response to incident infrared radiation and means for separately correcting offsets in the detection signals provided from the plurality of elements in the detector array to compensate for nonuniformities in the detector elements, wherein said means for correcting comprises an offset correction and circuit in each readout cell of the readout circuit and wherein each offset correction circuit comprises a plurality of parallel connected circuit elements and means for selectively electrically connecting said circuit elements into the readout cell in response to a stored offset correction value corresponding to said readout cell; and output means for providing the corrected detection signals as an output of the focal plane array;

means for storing a plurality of offset correction values corresponding to the plurality of detector elements; and means for providing the offset correction values to said means for correcting.

27. An infrared focal plane array, comprising:

a plurality of detector elements configured in a two dimensional array; and a readout circuit electrically coupled to said plurality of detector elements and structurally integrated therewith, said readout circuit comprising:

a sample and hold capacitor;

means for biasing the detector elements so as to provide an analog detection signal from each detector element corresponding to the infrared radiation incident thereon, wherein the analog detection signal is a voltage signal provided at a sample node coupled to the sample and hold capacitor; and means for correcting the analog detection signal from each detector element by a discrete offset correction and providing a corrected analog detection signal, wherein the discrete offset correction varies from detector element to detector element and comprises an offset correction voltage added to, or subtracted from, the analog detection signal, wherein said means for correcting subtracts or adds a variable amount of charge from said sample and hold capacitor to provide a corrected voltage signal at said sample node, and wherein said means for correcting comprises a plurality of capacitors connected between said sample node and a reference voltage and a corresponding plurality of switches coupled in series with each respective capacitor and said reference voltage, wherein said plurality of switches are selectively turned on or off to provide a desired amount of discrete offset correction for each detector element.

28. An infrared focal plane array as set out in claim 27, wherein said readout circuit further comprises means for controlling said means for correcting so as to selectively open and close said plurality of switches in a time multiplexed manner during readout of a plurality of separate detector elements.

29. An infrared focal plane array as set out in claim 27, wherein said detector elements comprise microbolometer detector elements.

30. An infrared focal plane array as set out in claim 29, wherein said means for said biasing comprises a constant current source coupled to said microbolometer detector elements and said sample and hold capacitor.

31. An infrared focal plane array as set out in claim 27, wherein said readout circuit further comprises a differential amplifier having first and second inputs, the first input thereof coupled to said sample node and said second input thereof coupled to a adjustable voltage source.

32. An infrared focal plane array as set out in claim 31, wherein said readout circuit further comprises a feedback capacitor coupled between the output of the differential amplifier and said first input thereof.

33. An infrared focal plane array as set out in claim 32, wherein said readout circuit further comprises a switch coupled between and parallel with said feedback capacitor between the output of the differential amplifier and the first input thereof.

34. An infrared focal plane array as set out in claim 27 wherein said plurality of detector elements and said readout circuit are formed as a single monolithic integrated circuit wherein said readout circuit acts as a substrate for said detector elements.

35. An infrared focal plane array, comprising:

a plurality of detector elements configured in a two dimensional array; and a readout circuit electrically coupled to said plurality of detector elements and structurally integrated therewith, said readout circuit comprising:

a sample and hold capacitor;

means for biasing the detector elements so as to provide an analog detection signal from each detector element corresponding to the infrared radiation incident thereon, wherein the analog detection signal is a voltage signal provided at a sample node coupled to the sample and hold capacitor; and means for correcting the analog detection signal from each detector element by a discrete offset correction and providing a corrected analog detection signal, wherein the discrete offset correction varies from detector element to detector element and comprises an offset correction voltage added to, or subtracted from, the voltage signal, wherein said means for correcting subtracts or adds a variable amount of charge from said sample and hold capacitor to provide a corrected voltage signal at said sample node, and wherein said means for correcting comprises a plurality of parallel connected constant current sources connected between said sample node and a reference voltage and a plurality of switches corresponding to said plurality of constant current sources and respectively coupled in series therewith.

*36. An infrared imaging system, comprising:*

*an infrared focal plane array comprising:*

*a plurality of infrared detector elements arranged in an array;*

*a readout circuit electrically coupled to the plurality of detector elements and comprising means for biasing the plurality of detector elements so as to provide separate detection signals corresponding to each detector element in the array, in response to incident infrared radiation and means for separately correcting offsets in the detection signals provided from the plurality of elements in the detector array to compensate for nonuniformities in the detector elements, wherein said means for correcting comprises:*

*a correction circuit including a plurality of circuit elements; and*

*means for selectively electrically connecting said circuit elements into the detector readout circuit in response to stored offset correction values; and*

*output means for providing the corrected detection signals as an output of the focal plane array;*

*means for storing a plurality of offset correction values corresponding to the plurality of detector elements; and*

*means for providing the offset correction values to said means for correcting.*

*37. An infrared imaging system as set out in claim 36, wherein said plurality of circuit elements comprise a plurality of capacitors.*

*38. An infrared imaging system as set out in claim 36, wherein said means for selectively connecting comprises a plurality of switches, equal in number to said plurality of circuit elements and connected in series therewith.*

*39. An infrared imaging system as set out in claim 36, wherein said plurality of circuit elements comprise a plurality of constant current sources.*

*40. An infrared imaging system as set out in claim 36, further comprising means, coupled to said output means, for analog to digital converting the corrected detection signals and providing corresponding image data for each detector element.*

*41. An infrared imaging system as set out in claim 36, wherein said plurality of detector elements comprise microbolometer detector elements.*

*42. An infrared imaging system as set out in claim 36, wherein said offset correction values are binary values and wherein said means for storing comprises a digital memory.*

*43. An infrared imaging system as set out in claim 36, wherein said array of detector elements and said readout circuit are formed as a single monolithic integrated circuit chip.*

*44. An infrared imaging system as set out in claim 36, further comprising timing means for providing focal plane timing signals to said readout circuit.*

*45. An infrared imaging system as set out in claim 36, wherein said plurality of detector elements are arranged in a plurality of rows and columns and wherein said means for correcting comprises a separate offset correction circuit for each column and wherein said means for providing said offset correction value provides said offset correction values in a time multiplexed manner to said means for correcting.*

*46. An infrared imaging system as set out in claim 36, wherein said output means comprises one or more output buffers.*

*47. An infrared imaging system as set out in claim 36, wherein said focal plane array further comprises a differential amplifier with first and second inputs wherein the first input is electrically connected to the readout circuit so as to receive the detection signals and wherein the second input is connected to an adjustable reference voltage.*

*48. An infrared imaging system, comprising:*

*an infrared focal plane array comprising:*

*a plurality of infrared detector elements arranged in an array;*

*a readout circuit electrically coupled to the plurality of detector elements and comprising a plurality of readout cells equal in number to the plurality of detector elements, means for biasing the plurality of detector elements so as to provide separate detection signals corresponding to each detector element in the array, in response to incident infrared radiation and means for separately correcting offsets in the detection signals provided from the plurality of elements in the detector array to compensate for non-uniformities in the detector elements, wherein said means for correcting comprises an offset correction circuit in each readout cell of the readout circuit and wherein each offset correction circuit comprises a plurality of circuit elements and means for selectively electrically connecting said circuit elements into the readout cell in response to a stored offset correction value corresponding to said readout cell; and*

*output means for providing the corrected detection signals as an output of the focal plane array;*

*means for storing a plurality of offset correction values corresponding to the plurality of detector elements; and*

*means for providing the offset correction values to said means for correcting.*

*49. An infrared focal plane array, comprising:*

*a plurality of detector elements configured in a two dimensional array; and*

*a readout circuit electrically coupled to said plurality of detector elements and structurally integrated therewith, said readout circuit comprising:*

*a sample and hold capacitor;*

*means for biasing the detector elements so as to provide an analog detection signal from each detector element corresponding to the infrared radiation incident thereon, wherein the analog detection signal is a voltage signal provided at a sample node coupled to the sample and hold capacitor; and*

*means for correcting the analog detection signal from each detector element by a discrete offset correction and providing a corrected analog detection signal, wherein the discrete offset correction varies from detector element to detector element and comprises an offset correction voltage added to, or subtracted from, the analog detection signal, wherein said means for correcting subtracts or adds a variable amount of charge from said sample and hold capacitor to provide a corrected voltage signal at said sample node, and wherein said means for correcting comprises a plurality of circuit elements connected between said sample node and a reference voltage and a corresponding plurality of switches coupled in series with each respective circuit element and said reference voltage, wherein said plurality of switches selectively provide a desired amount of discrete offset correction for each detector element.*

*50. An infrared focal plane array as set out in claim 49, wherein said readout circuit further comprises means for controlling said means for correcting so as to selectively open and close said plurality of switches in a time multiplexed manner during readout of a plurality of separate detector elements.*

*51. An infrared focal plane array as set out in claim 49, wherein said detector elements comprise microbolometer detector elements.*

*52. An infrared focal plane array as set out in claim 49, wherein said readout circuit further comprises a differential amplifier having first and second inputs, the first input thereof coupled to said sample node and said second input thereof coupled to a adjustable voltage source.*

*53. An infrared focal plane array as set out in claim 49 wherein said plurality of detector elements and said readout circuit are formed as a single monolithic integrated circuit wherein said readout circuit acts as a substrate for said detector elements.*

*54. An infrared focal plane array, comprising:*

*a plurality of detector elements configured in a two dimensional array; and*

*a readout circuit electrically coupled to said plurality of detector elements and structurally integrated therewith, said readout circuit comprising:*

*a sample and hold capacitor;*

*means for biasing the detector elements so as to provide an analog detection signal from each detector element corresponding to the infrared radiation incident thereon, wherein the analog detection signal is a voltage signal provided at a sample node coupled to the sample and hold capacitor; and*

*means for correcting the analog detection signal from each detector element by a discrete offset correction and providing a corrected analog detection signal, wherein the discrete offset correction varies from detector element to detector element and comprises an offset correction voltage added to, or subtracted from, the voltage signal, wherein said means for correcting subtracts or adds a variable amount of charge from said sample and hold capacitor to provide a corrected voltage signal at said sample node, and wherein said means for correcting comprises a plurality of constant current sources connected between said sample node and a reference voltage and a plurality of switches corresponding to said plurality of constant current sources and respectively coupled in series therewith.*

* * * * *

UNITED STATES PATENT AND TRADEMARK OFFICE

CERTIFICATE OF CORRECTION

PATENT NO. : RE 40,249 E
APPLICATION NO. : 09/667826
DATED : April 22, 2008
INVENTOR(S) : Cannata et al.

It is certified that error appears in the above-identified patent and that said Letters Patent is hereby corrected as shown below:

Claim 26, Column 20, line 41, delete "and".

Signed and Sealed this

Eighth Day of July, 2008

JON W. DUDAS
*Director of the United States Patent and Trademark Office*